United States Patent

[11] 3,622,656

[72] Inventors David B. Dewey, Jr.
Rancho Sante Fe;
Norman W. Schofield, San Diego, both of Calif.
[21] Appl. No. 827,636
[22] Filed May 26, 1969
[45] Patented Nov. 23, 1971
[73] Assignee General Dynamics Corporation
San Diego, Calif.

[54] METHOD OF MANUFACTURING REINFORCED WALL STRUCTURE
5 Claims, 13 Drawing Figs.

[52] U.S. Cl. .................................................. 264/35,
25/DIG. 21, 52/650, 264/309
[51] Int. Cl. .................................................. B28b 19/00,
B28b 23/02, E04b 1/16
[50] Field of Search .......................................... 264/35,
309; 25/DIG. 21, 131 Z, 131 M; 52/650, 422, 378

[56] References Cited
UNITED STATES PATENTS

| 1,281,408 | 10/1918 | Marquess | 264/309 X |
| 1,324,027 | 12/1919 | Block | 52/422 |
| 2,187,223 | 1/1940 | Cory | 25/131 Z X |
| 2,301,760 | 11/1942 | Sutton | 25/DIG. 21 |
| 3,402,522 | 9/1968 | Guddal | 52/344 X |
| 3,461,639 | 8/1969 | Merrill | 52/650 X |

Primary Examiner—Robert F. White
Assistant Examiner—J. H. Silbaugh
Attorneys—Neil F. Martin and Carl R. Brown ABSTRACT: A large buoy construction of relatively thin wall composite material, which walls are integrally formed and interconnected by a reinforcing matrix frame comprising reinforcing members sandwiched between layers of screens, to which the cement-type material can be applied by use of power equipment in a rapid application and thorough penetration into the matrix to accomplish onsite formless molding of integral, unitary structures having complex shapes and junctions.

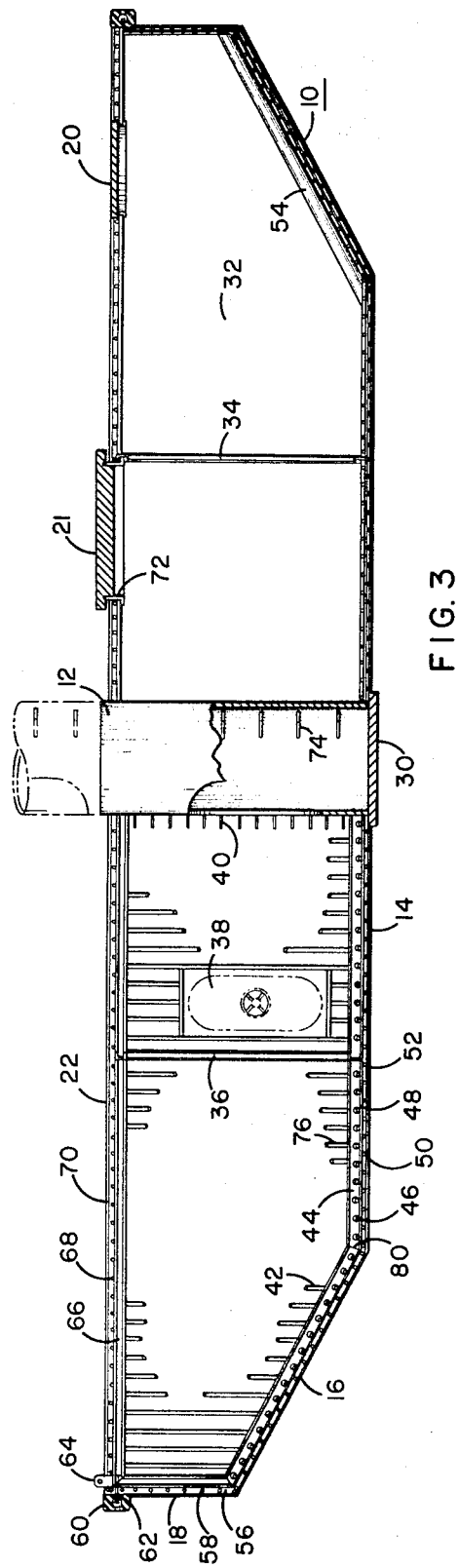

INVENTOR.
DAVID B. DEWEY Jr.
NORMAN W. SCHOFIELD
BY Neil F. Martin

ATTORNEY

PATENTED NOV 23 1971 3,622,656

INVENTOR.
DAVID B. DEWEY Jr.
NORMAN W. SCHOFIELD
BY
ATTORNEY

INVENTOR.
DAVID B. DEWEY Jr.
NORMAN W. SCHOFIELD
BY

ATTORNEY

PATENTED NOV 23 1971 3,622,656
SHEET 5 OF 5
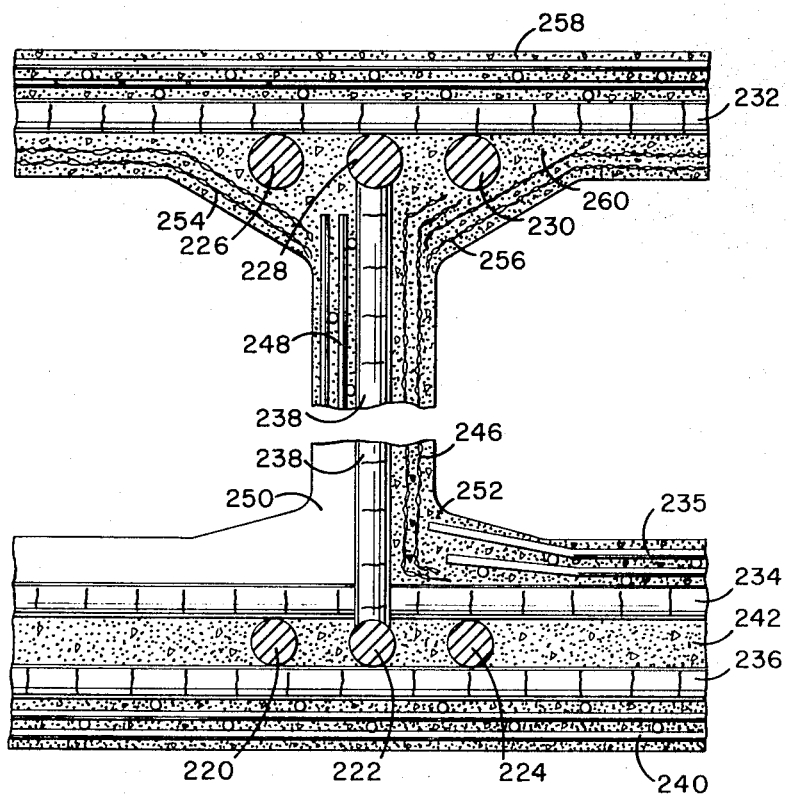
FIG.9
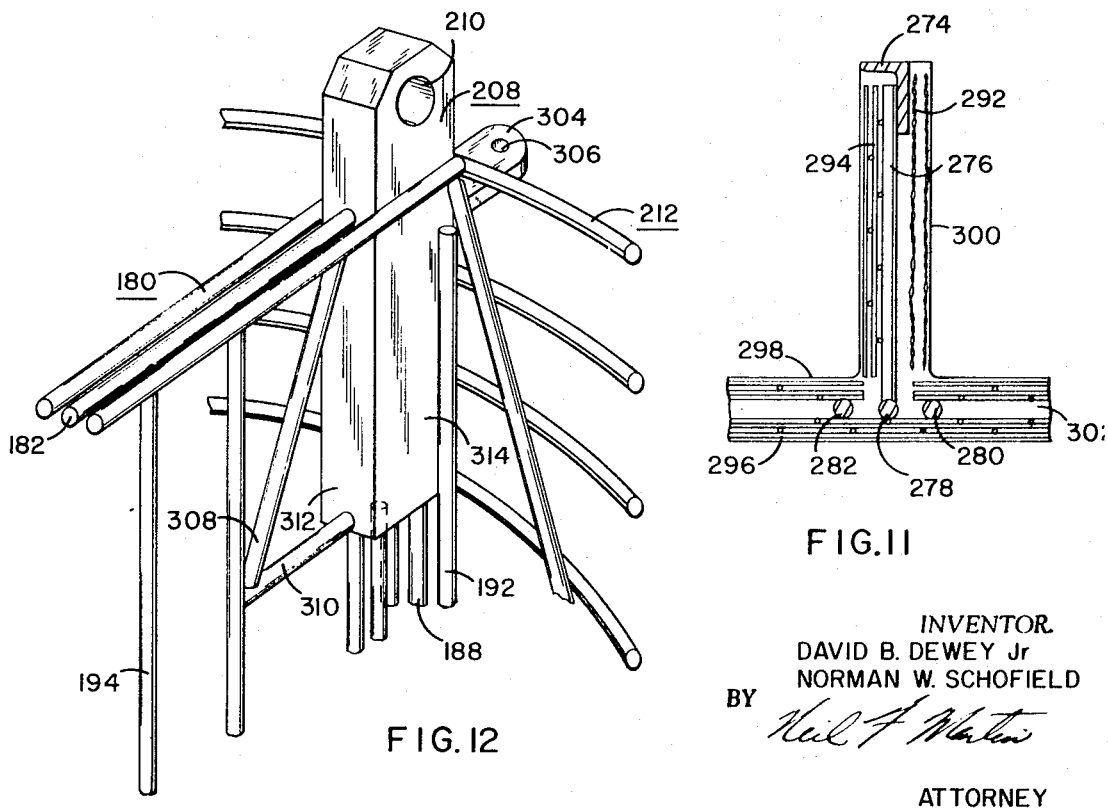
FIG.12
FIG.11
INVENTOR.
DAVID B. DEWEY Jr
NORMAN W. SCHOFIELD
BY
ATTORNEY

3,622,656

METHOD OF MANUFACTURING REINFORCED WALL STRUCTURE

BACKGROUND OF THE INVENTION

Buoys have long been used as navigational aids in bodies of water. With the increased use of electronic equipment in providing navigational information to passing ships and the like, it has been necessary to increase the size of such navigational buoys to provide ease of access to the internal volume of the buoys to service electronic navigation equipment and to provide a relatively stable platform for antennas. While these buoys may be constructed in the conventional manner of constructing ships, such as by use of known steel fabrication techniques, such steel fabricated buoys are expensive and time consuming to construct and require considerable maintenance to preserve the steel structure. Thus it is advantageous to make such large buoys by other construction techniques, such as by making the buoys of concrete.

While large buoys constructed of concrete have advantages, the normal techniques for constructing concrete vessels present construction problems. The walls of the concrete vessel cannot be too thick or the structure becomes too heavy. Further the vessel or buoy requires internal bracing that has complex shapes and complex junctions that are difficult to efficiently fabricate using known processes and techniques. To construct such complex structures from separately formed wall elements, requires the wall elements to be separately fabricated and then assembled. This makes it difficult to achieve unitary strength and the use of the separate forming steps is time consuming, expensive, and difficult to accomplish. Thus it is advantageous to have a new and improved concrete buoy structure and method of making the structure that provides a large and inexpensive buoy that is integrally formed on site in a quick and inexpensive manner and with a minimum use of forms, and which structure may employ power tools to obtain application of cement material to a steel reinforcing frame work.

SUMMARY OF THE INVENTION

In an exemplary embodiment of this invention, a large buoy is constructed from thin wall composite material that has steel fibers strategically placed in mixed cement material. These steel fibers are sandwiched between screen layers such as wire mesh and metal lath form a matrix to which air-accelerated, premixed cement binder material is rapidly applied with thorough penetration into the matrix. In one mode of wall construction, one of the screen layers is relatively open and the other screen layer on the opposite side of the steel fibers is relatively dense. The cement binder material is projected from a discharge nozzle through the relatively open screen layer and against the relatively dense screen layer. The relatively dense screen layer stops the projected cement mixture, with the mixture only penetrating to fill all voids in the dense screen and allow a cement surface on the other side of the dense screen. The cement mixture fills the space around the steel fibers and the relatively open screen, providing a wall structure that has a uniform thickness and is made without forms. This is accomplished through use of power tools and achieves a wall without voids therein. Thus the formless molding of the relatively thin wall achieves an optimum working of the cement material into the steel reinforcing without requiring hand working. The use of this method of construction facilitates fabrication complex shapes and complicated junctions of the buoy structure and allows final unitary construction of the entire buoy at a given site. The steel reinforcing matrix is integrally tied together to form an entirely enclosed composite buoy frame with internal walls, to which the cement mixture is applied.

The vessel or buoy construction has a relatively large size with a plurality of walls and bulkheads that provide internal, integral support and watertight areas for the storing of navigational equipment. The structure is made substantially entirely of a cement mixture with steel reinforcing, and yet has relatively thin walls and thus considerable buoyancy for its size. The buoy has means for towing and has a unique fender structure for protecting the outer edge.

It is therefore an object of this invention to provide a new and improved buoy construction.

It is another object of this invention to provide a new and improved method of constructing reinforced thin wall composite material structures.

It is another object of this invention to provide a new and improved buoy structure employing a new and improved method of constructing reinforced thin wall concrete structures in which the entire buoy construction is fabricated in place.

It is another object of this invention to provide a new and improved concrete buoy construction in which the handling damage to bulkheads is reduced, the overall drying time for the cement mixture in the buoy is reduced, greater control over the application of the cement mixture to the reinforcing structure is increased and the cement mixture can be applied in less time than in previous methods.

It is another object of this invention to provide a new and improved method of constructing reinforced thin wall concrete structures in which use of forms to make complex shapes and complicated junctions are eliminated and the cement binding material is applied mechanically to reduce voids.

Other objects and many advantages of this invention will become more apparent upon a reading of the following detailed description and an examination of the drawings wherein like reference numerals designate like parts throughout and in which:

FIG. 1 is a side elevational view of a buoy construction of this invention.

FIG. 2 is a top view with parts broken away showing the internal construction of the buoy structure of FIG. 1.

FIG. 3 is a cross sectional view taken along lines 3—3 of FIG. 2 with parts broken away.

FIG. 9 is a cross-sectional illustrative view with parts broken away of another mode of constructing joined wall panels.

FIG. 11 is a cross-sectional illustrative view of the lower portion of the open wall structure of FIG. 10.

FIG. 12 is a perspective view with parts broken away of the towing frame structure.

Figure 4:
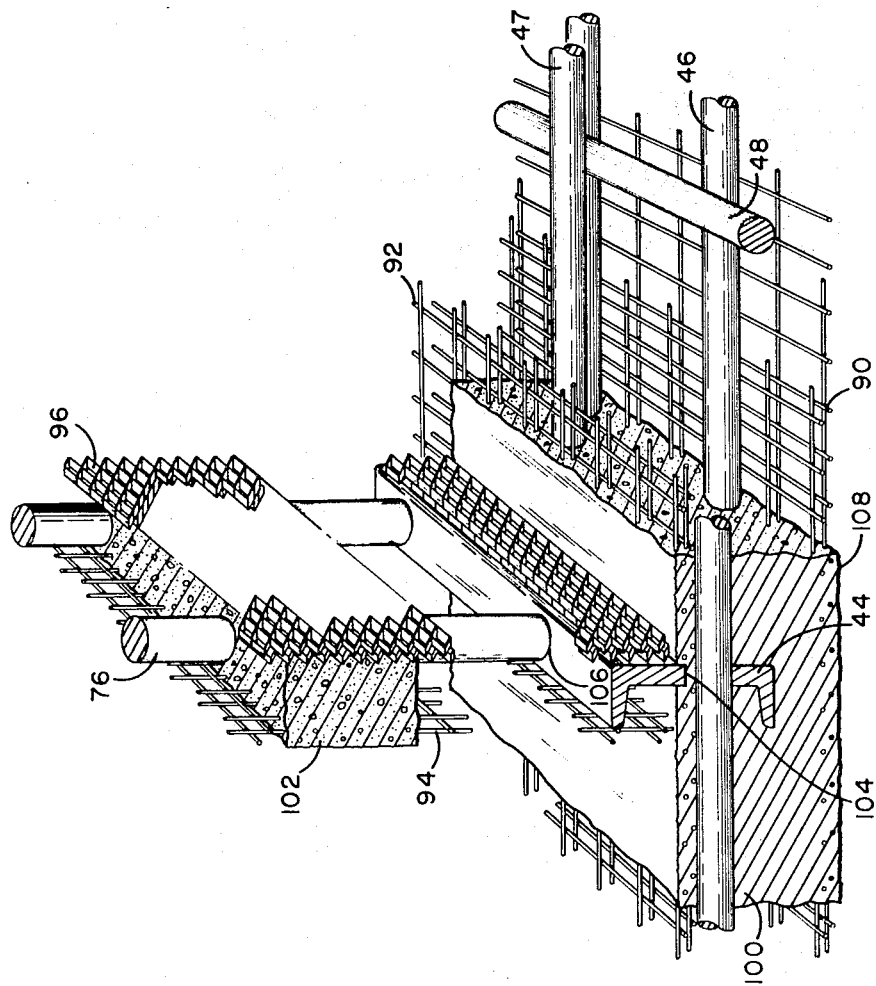
FIG. 4 is a perspective view with parts broken away illustrating the manner of constructing intersecting wall panels employing the method and structure of this invention.

Referring now to FIG. 1, a large buoy structure 10 has a circular hull 14 with slanted bottom surface 16 and vertical sides 18. The upper deck 22 of the buoy 10 has rungs 19 facilitating movement from the side of the buoy 10 to a central column 12. Bulkhead hatches 21 allows access to the internal volume of the buoy structure 10 and a watertight door 24 allows access through center column 12 to the internal volume of the buoy structure. The upper super structure 26 of the center column 12, supports navigational aid equipment such as radar antennas, transmitting and receiving antennas, lights, and the like. As a representative size for the buoy structure 10, the hull diameter may be about 40 feet with a 7½ foot depth and the central column 12 having a diameter of about 6 feet and a height as determined by the particular use of the buoy structure. It should be understood that these dimensions and other dimensions hereinafter given relative to the buoy structure are representative only.

Referring now to FIGS. 2, 3, 4, and 5, the buoy structure comprises thin wall panels of composite material that are formed of steel reinforcing bars and wire mesh that are covered with a cement binder material. The bottom surface of the hull 14 comprises two layers 90 of welded wire mesh that, for example, may comprise 16 gauge wire having an opening spacing of approximately 1 inch by one-half inch. Positioned above the layers of welded wire mesh 90 are interlocking reinforcing, rebar members 46 and 48 that may be made of steel. Rebars 48 extend radially from the center of the structure or from the central column 12 to the outer side of the hull 14 and rebars 46 and 47 are circular and are concentrically spaced from the central column 12 to the outer edge of the hull 14 and up the sides 18 of the buoy 10. Also extending radially outward from the center column 12 are beam members 44 that have openings 104 cut therein along their length for passing rebars 47. Rebars 46 pass underneath the lower edge surface of the beam members 44 and above the lower welded wire mesh 90. A second layer of welded wire mesh 92 rests on the top of the upper rebars 47 and are positioned between each of the radially extending beam members 44, see FIG. 4.

Figure 5:
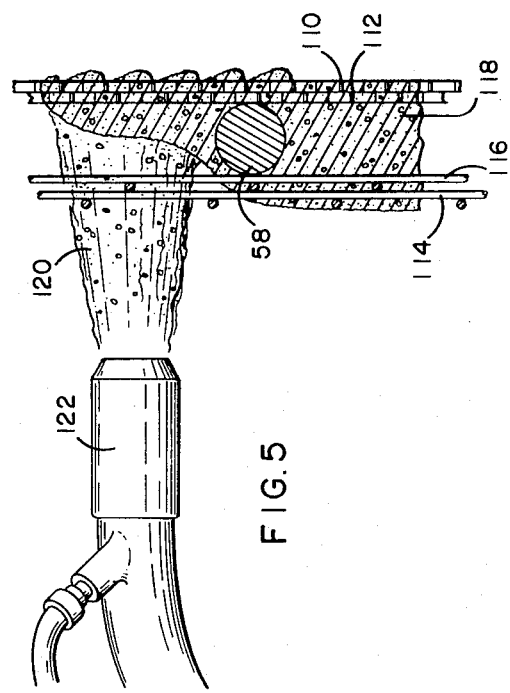
FIG. 5 is a side view illustrating the power application of cement-binding material to the reinforcing steel matrix to construct thin wall panels without forms in the manner of this invention.

The wall members, as for example wall member 32, comprises vertical rebar members 76 that are rigidly secured, by butt-welds 106 or by other suitable joining techniques, integrally to the upper surface of he beam 44. Positioned on one side of the vertical rebars 76 is a pair of sheets of welded wire mesh 94 and on the opposite surface of rebars 76 is positioned a pair of sheets of expanded metal lath 96. The expanded metal lath 96 may, for example, be 3.4 pound expanded metal lath having diamond shaped openings that are approximately one-fourth by three-eighths inch. The thickness of the expanded metal lath is in the order of one-sixteenth of an inch. This structure, as illustrated in FIGS. 3, 4, and 5, extends through out the hull of the buoy structure 10. This structure also extends outwardly to where the beam members 44 angle upwardly at 80 to form the side chines 16 and then bend vertically to from the vertical sides 18. The vertical beam members 56 are secured to upper beams 66 that extend horizontally above the beam members 44. The circular hull portion 16 has the same structure as the bottom of hull 14 with the circular rebar members 56 encircling the hull structure. Positioned on the upper surface of the radial beam members 66 to form the deck 22, are circular and concentrically arranged rebar members 58 that are spaced radially outward to the side 18 and then continue down as rebar members 58 providing a continuous circular rebar enclosure. Holes are not placed in beams 56 and 66 for passing rebars 58 and 68 therethrough. In the structure of the deck 22, the previously described layers of expanded metal lath 96 of FIG. 4 are positioned on the underneath surface of the beam members 66 and with their edges overlapping the metal lath 96 and the welded wire mesh 94 at each intersection with the vertical walls 32, substantially as illustrated in FIG. 9. Welded wire mesh 70 is then positioned on the upper surface of the rebars 68.

The process of applying the cement mixture to the reinforcing frame structure previously described is accomplished in the manner illustrated in FIGS. 4 and 5. Generally a base form, not shown, that may be made of any suitable material such as plywood, steel, or the like is constructed and supported to provide a rigid form for supporting the lower reinforcing structure of the buoy, namely the lower hull wall and the angled side hull wall 16. The outer side walls 18 of the hull have the same structure as previously described relative to the deck 22 and the center walls 32. The cement mixture, which may comprise a mixture of one and one-half part sand to each one part cement, is premixed with water and projected under force through a known plastering machine dispensing nozzle 122. The nozzle 122 utilizes air under pressure to force the cement mixture in the form of a stream into the structure. The air pressure has sufficient force to force the cement mixture 120 through the welded wire mesh 94 into the expanded metal mesh 96. The cement mixture, when impacting against the metal mesh 96, passes through the openings in the double layered mesh in sufficient quantities to extend only slightly out the openings as illustrated in FIG. 5. Through correct maneuvering of the nozzle 122, the amount of cement mixture deposited into the welded wire mesh 114 and 116 extends only slightly outside this mesh. Accordingly, by means of dressing up the surfaces on each side of the vertical wall members, the cement-binding material is completely distributed into the wall structure and only a slight amount of smoothing of the outer surface is necessary to provide the thin wall concrete structure. Since the lower hull structure is resting on forms, the cement mixture 108 is projected by nozzle 122 directly into the reinforcing structure and against the form underneath these hull structures. Thus the cement material 108 is deposited by nozzle 122 in a direct manner onto the form surface and the material passes through the relatively open layers of welded wire mesh 90 and 92. The corners of the joints may be shaped into the configuration illustrated in FIG. 9. Thus it may be seen that the joints between the hull and the walls are integrally connected by integral reinforcing members and the cement mixture is applied thereto in a quick and efficient manner to provide the thin wall structures without requiring forms for other than the bottom of the hull structure. The entire structure may be sprayed in a relatively quick and efficient manner with power equipment. The cement mixture is normally applied to the deck 2 after the hull and wall members have been constructed. The reinforcing deck structure is then covered with the cement mixture and the lower surface of the layers of expanded metal lath holds the cement mixture is the manner of the wall construction illustrated in FIG. 5. The deck 22 is thus constructed without forms. Also in forming the lower hull structure, mechanical agitators or tampers may be used to assure complete mixture of the cement mixture into the layers of wire mesh 90 and 92 and around the rebars 46, 47, and 48.

It should be recognized that the use of the frames of rebars sandwiched between the layers of welded wire mesh and expanded metal lath covered with the cement mixture, provides a very strong reinforced concrete wall structure. However the method that allows the use of mechanical means, such as nozzle 122, to force the cement mixture into frames; provides complete mixing of the cement mixture with the rebars, mesh and lath that eliminates voids and spaces in the walls that could cause leaking and other problems. Further the ability of being able to apply the cement mixture to the walls without forms, allows visual inspection of the structures to assure complete mixing of the cement mixture with the frames and without voids.

In further describing the buoy structure, steel central column 12 has a lower wall 30 that extends below the surface of the bottom of the hull 14 and has a circular outer shoulder. The central column has a ladder 74 and a bulkhead opening 43 for access to the four compartments. The wall portions 32 and 39 extend to an inner wall 34, 36 and 37 that provides an internal compartment for storing various equipment such as navigational equipment. Bulkhead openings 38 permit access between the four compartments. The deck 22 has at least one equipment opening 21 that is secured in the known manner and locked from the inside of the main compartment. Other deck access openings 20 are of the circular manhole type and bolt in place over the peripheral 1 compartments. A marine fender 60, that may be made of resilient material, is held by bolts 62 around the outer circumference of the hull structure. An upwardly projecting plate 64 is welded to the beam 66 and provides a means for securing a tow line or mooring chain to the buoy 10. The entire exterior surface of the main deck of the buoy is normally coated with a nonskid paint and a protective paint coating is applied to the other metal and concrete surfaces of the buoy. Thus the entire structure is constructed in place with the reinforcing members integrally connected. The combination reinforcing frame using the expanded metal lath avoids voids in the cement binder, reduces or eliminates excessive vibration time, and reduces the problems of lack of dimensional control of wall thicknesses.

Figure 6:
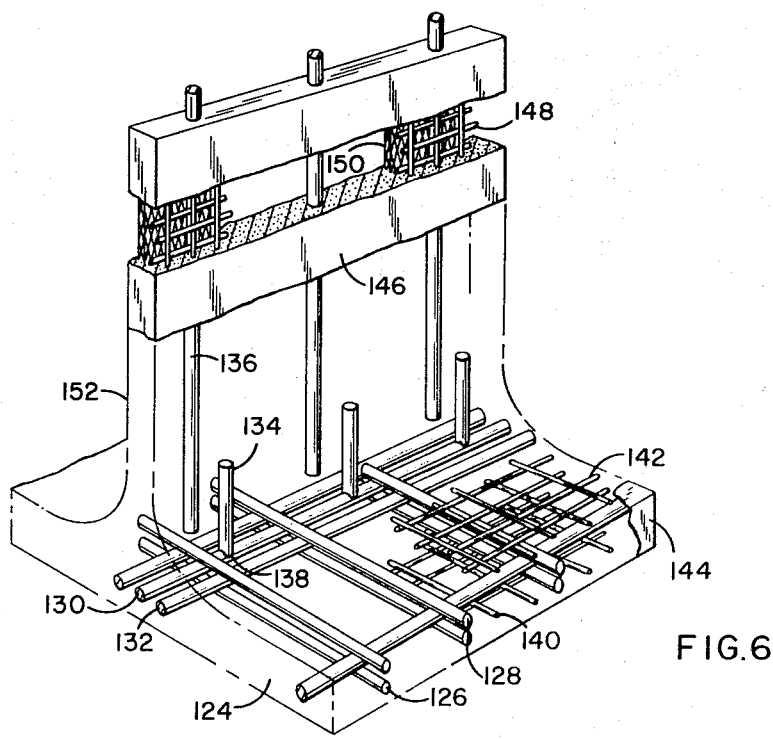
FIG. 6 is a perspective, diagrammatic view illustrating another method of constructing intersecting wall panels.

A modified structure, see FIG. 6, comprises the replacement of the beams 44, 56, and 66 with three rebar members 130 and 132. In this construction, a central rebar member 130 has vertical rebar members 134, welded thereto at 138. In this particular modified embodiment, the vertical rebars 134 have only a short length allowing the layout of the bottom frame structure and then laying out of the reinforcing frames of the wall structure 152. In this construction, the circular rebars 126 and 128 are positioned above and below the radially directed rebar members 130 and 132. Layers of welded wire mesh 140 and 142 provide the bottom reinforcing structure in the same manner as previously described in FIG. 4. The wall structures 152 have the same structure as that described relative to FIG. 4 with the expanded metal lath 150 positioned on one side of the rebar members 136 and the layers of welded wire mesh 148 positioned on the opposite side of the rebar members 136. The adjacent ends of the rebar members 136 and 134 are tied together by wires or the like to hold the wall members in position for receiving the cement binder material.

In still another embodiment, see FIG. 9, the three rebar members 220, 222, and 224 are directed radially outward from the central bulkhead 30 with the vertical rebar members 238 being welded at their bottom ends to the central rebar 222 and at their upper ends to the central rebar 228 of the group of three rebar members 226, 228, and 230 that form the deck reinforcing structure. This same deck reinforcing structure is employed and secured to the upper ends of the rebar members 136 in FIG. 6. In the embodiment illustrated in FIG. 9, the layers of expanded metal lath 246 extends from the upper three rebar members to the lower rebars 234. The ends of the upper layers of welded wire mesh 235 overlap the lower ends of the expanded metal lath 246 and at the upper ends, the layers of expanded metal lath 256 overlap the upper edges of the expanded metal lath 246. This provides an integral connection of the rebar reinforcing structure and the cement binder material forming an integral wall structure with angled corners 250 and 252.

Figure 7:
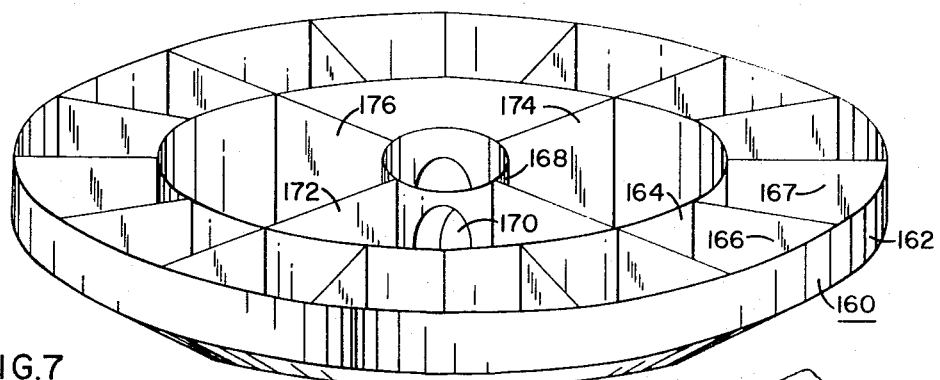
FIG. 7 is a diagrammatic illustration of the internal walls and bulkhead structure of another embodiment of the buoy structure.
Figure 13:
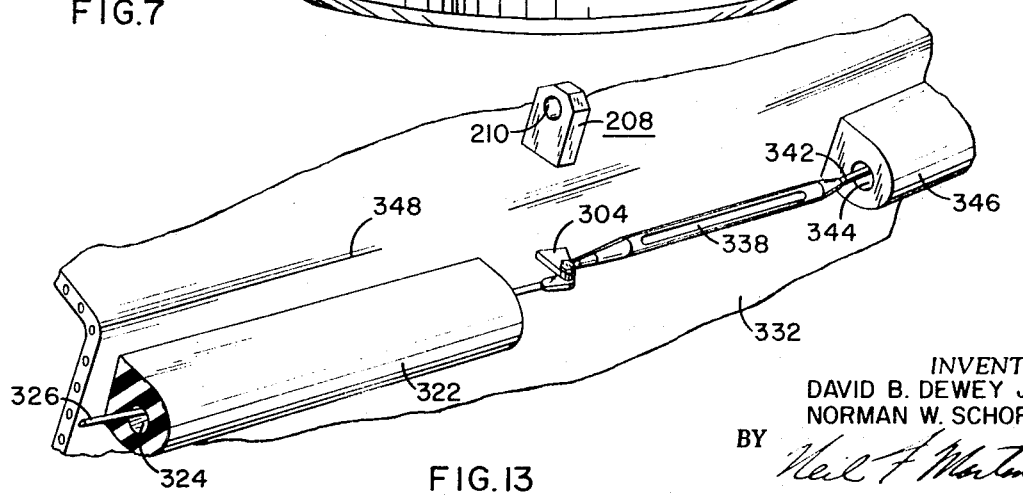
FIG. 13 is a perspective view of a fender structure of the buoy.
Figure 8:
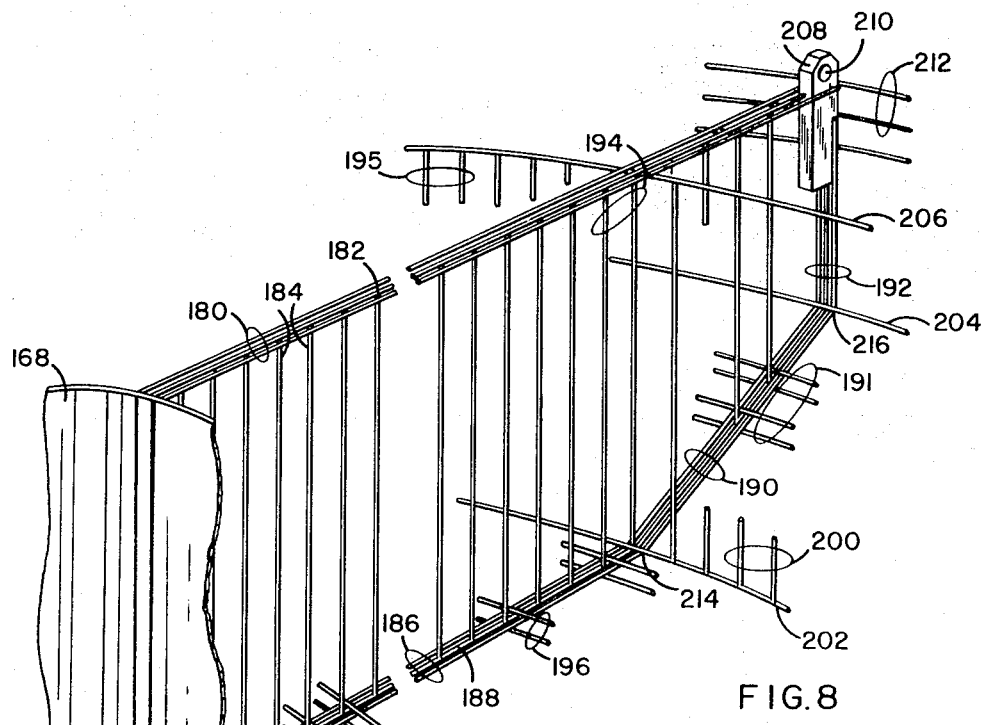
FIG. 8 is a perspective view with parts broken away illustrating the arrangement of steel reinforcing the integral construction of bulkheads, walls and hulls of the buoy structure.

In another form of the hull structure, the four inner compartments, see FIG. 7, are defined by a circular outer bulkhead 164 having inner walls 172, 174, and 176 with a steel central column 168 having access openings 170. In this structure, and employing the modified structural arrangement of FIGS. 6 or 9, the frame structure comprises the three radially extending rebar members 186, see FIG. 8, with vertical rebar members 184 being secured to the central rebar members 182 and 188. Circular rebars 196 encircle the lower wall of the hull in the manner previously described. The three rebar members 186 are integrally connected with rebar members 190 that in turn are integral with the side rebar members 192. The side rebar members 192 are connected to the upper radially extending deck rebar members 180 and 270 in the manner illustrated in FIG. 10. This provides a complete integral structure throughout the radial dimensions of the hull structure. The tie line securing plate 208 having an opening 210, see FIGS. 8, 12 and 13, is secured to the various connecting rebar members 180, 182, 188, 192, 212, 308, and 310 as illustrated Also secured to the outer edge surface of the plate 208 is a plate 304 having an opening 306 as seen in FIG. 13. The plate 208 with lower portion 314 and the rebar members are embedded into the cement binder material 348 with only the ends 208 and 304 projecting.

Figure 10:
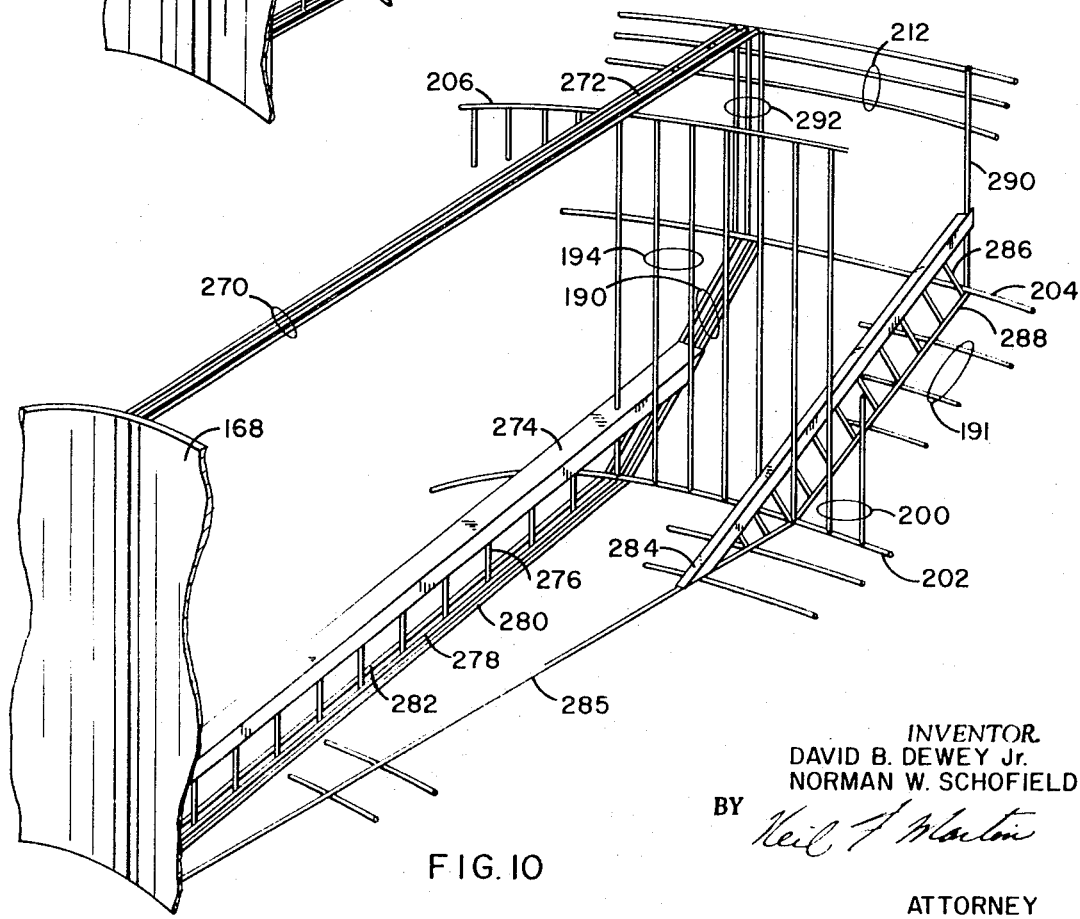
FIG. 10 is a perspective view with parts broken away illustrating the frame reinforcing structure of an open wall portion of the buoy construction.

As previously described, only certain ones of the radial extending wall members are closed, as for example wall members 172, 174 and 176, to provide enclosed equipment compartments. Other wall members are open and have a reinforcing frame construction as illustrated in FIG. 10. In this construction, see FIGS. 10 and 11, an L-shaped beam member 274 is secured to vertical rebar member 276 that are in turn welded to the center rebar member 278 of the group of radially extending rebar members 278, 280 and 282. In this structure the upper welded wire mesh 298 and the lower welded mesh 297 function in the manner previously described and are held by a cement binder material 302 in the manner previously described. Further for this limited vertical wall structure, the welded wire mesh 294 and expanded metal lath 29 support the cement mixture in the manner previously described. One of the ends of the beam member 274 is secured to the central column 168 with the other ends secured to the three rebar members 190 by welding or other suitable techniques. Vertical rebar members 200 connect to a circular rebar 202 at the intersection of the bottom of the hull with the angled bottom 16 and extend circumferentially around the hull structure providing the reinforcing frame for the outer circular wall 164. Upper rebar members 206 pass under and abut against the radially extending rebar members 270. As additional structure support, chine beam members 284 are secured at spaced intervals between each of the short wall members 166 and 167 and are secured to rebar members 286 that are in turn secured to the integral rebar members 285, 288 and 290. The radially extending rebar members 191 pass under the rebar member 288 to provide an integral frame reinforcing structure. This entire structure, as illustrated in FIGS. 8, 10 and 12, is secured together by the cement binding material in the method and manner previously described and this structure provides a larger internal equipment area than the structure illustrated in FIG. 2.

In a modified form of the fender of FIG. 3, a fender, see FIG. 13, is secured to the plate member 304. The fender comprises a plurality of elongated resilient bar members 322 and 346 having flat surfaces that abut against the outer wall 332 of the buoy hull. Cables 326 and 342 extend through channels 324 and 344 between the plates 304, and turn buckles 338 provides means for tightening cables 326 and 342 to hold the resilient fenders 322 and 346 in position. Also in FIG. 13 the curved edge 348 of the hull structure is illustrated.

With reference to the structures illustrated in FIGS. 7, 8 and 10, the wall members of FIG. 8 correspond, for example, to the wall members 172 of FIG. 7. There are four of these wall structures in the buoy construction. The wall structure of FIG. 10 corresponds to the wall structures 166 and 167 as illustrated in FIG. 7. The chine structures of FIG. 10 are positioned in intervals, as illustrated by the chine structures 54 of FIG. 2. As an example only, the rebar members 180 in FIG. 8 and 270 in FIG. 10, may be three-fourths inch steel bars and the vertical rebar members 184 and 276 may be one-half inch steel bar members.

Having described our invention, we now claim:

1. The method of making integral intersecting wall structures comprising the steps of,
laying a plurality of first spaced reinforcing bars including at least one reinforcing member in a given plane or a form,
securing a plurality of second spaced reinforcing bars along the length of said reinforcing member, which plurality of second bars lay in a wall frame that is at an angle to said given plane,
placing first layers of relatively open screen material above and below said first spaced intersecting reinforcing bars,
sandwiching said plurality of second spaced reinforcing bars between second layers of relatively open screen material and layers of relatively dense screen material,
projecting a cement mixture in a pressurized stream through said first layers and against the form in sufficient volume to fill the spaces in said first layers of screen material and the volume therebetween,
projecting a cement mixture in a pressurized stream through said second layers of relatively open screen material and against said layers of relatively dense screen material,
projecting said cement mixture in a pattern in sufficient volume to fill the spaces in said second layers of relatively open screen material and said layers of relatively dense screen material and the volume therebetween, and curing said cement mixtures forming relatively thin reinforced concrete intersecting walls.

2. The method as claimed in claim 1 including the step of, overlapping adjacent edges of adjacent layers of said screen material at intersections of said first reinforcing bars and said reinforcing member, and said second reinforcing bars.

3. The method as claimed in claim 1 including the steps of, rigidly securing a second reinforcing member to the upper ends of said plurality of second spaced reinforcing bars in said wall frame, laying a plurality of third spaced reinforcing bars on said second reinforcing member in intersecting relationship, placing third layers of relatively open screen material on the upper side of said third reinforcing bars and second layers of relatively dense screen material on the bottom side of said third reinforcing bars, projecting a cement mixture in a steam through said third layer of relatively open screen material and against said second layers of relatively dense screen material, projecting said cement mixture in a pattern in sufficient volume to fill the spaces in said third layers of relatively open screen material and said second layers of relatively dense screen material and the volume therebetween, and curing said cement mixture.

4. The method as claimed in claim 1 in which, said reinforcing member comprises a beam with holes therethrough along the length thereof of for receiving ones of said first reinforcing bars, and others of said first reinforcing bars are positioned below said beam.

5. The method as claimed in claim 1 in which, said plurality of first spaced reinforcing bars comprises a matrix of spaced, intersecting reinforcing bars, and said reinforcing member comprises at least two aligned and adjacently positioned reinforcing bars with said second spaced reinforcing bars being rigidly secured to one of said two aligned bars.

* * * * *